United States Patent [19]
Gadwal et al.

[11] 3,938,006
[45] Feb. 10, 1976

[54] ACTIVE NEGATIVE SEQUENCE CABLE MONITOR

[75] Inventors: Govind Rao Gadwal, Bradford, Pa.; Eldon Keith Stanek, Morgantown, W. Va.

[73] Assignee: The United States of America as represented by the Secretary of the Interior, Washington, D.C.

[22] Filed: Feb. 5, 1975

[21] Appl. No.: 547,276

[52] U.S. Cl. ............... 317/18 C; 317/27 R; 317/45; 317/47; 324/51
[51] Int. Cl.² ........................................ H02H 3/16
[58] Field of Search .... 317/18 C, 18 B, 18 A, 18 R, 317/27 R, 47, 48, 13 R, 45; 307/127; 324/83 Q, 107, 108, 51; 340/253 Y

[56] References Cited
UNITED STATES PATENTS

| | | | |
|---|---|---|---|
| 3,699,391 | 10/1972 | Eilts | 317/27 R |
| 3,732,464 | 5/1973 | Miki et al. | 317/27 R |
| 3,848,160 | 11/1974 | Boothman et al. | 317/27 R |
| 3,891,894 | 6/1975 | Scarpino | 317/18 C |

*Primary Examiner*—James D. Trammell
*Attorney, Agent, or Firm*—Thomas Zack; Donald R. Fraser

[57] ABSTRACT

A ground conductor break in a polyphase A.C. cable having a separate power conductor and an equal number of symmetrically spaced ground conductors for each phase is detected by sensing negative-sequence current components being induced in the ground conductors. In response to two or more ground conductors of a three-phase cable being broken, the break is detected by sensing a current flow in one of the power conductors and an absence of positive sequence current components in the ground conductors. In response to the broken ground conductor being sensed, power conductors are open circuited. The sequence components are sensed with a network including a channel responsive to the current induced in each ground conductor. Each channel includes a current transformer for deriving an A.C. voltage that is a replica of the induced current for the conductor of the particular channel. The network includes operational amplifiers responsive to the voltages derived from the current transformers. Each operational amplifier includes an input circuit including a series resistor and capacitor, as well as a feedback resistor, to provide 240° phase shift between its input and output voltages.

14 Claims, 3 Drawing Figures

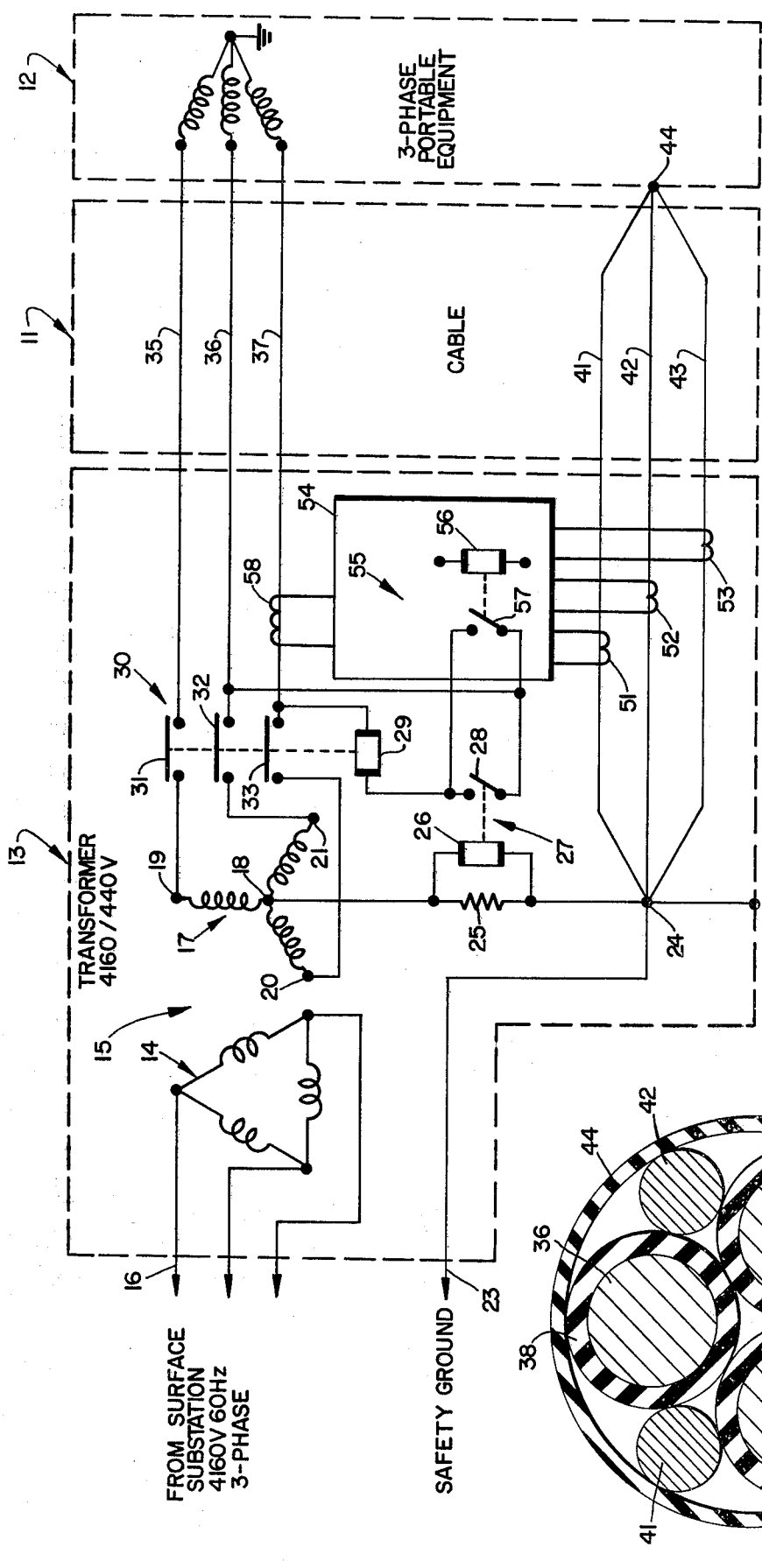

ACTIVE NEGATIVE SEQUENCE CABLE MONITOR

FIELD OF THE INVENTION

The present invention relates generally to apparatus for detecting a broken ground conductor in a polyphase cable and, more particularly, to apparatus responsive to sequence components induced in a plurality of ground conductors in a polyphase cable.

BACKGROUND OF THE INVENTION

In the mining industry, high voltage, polyphase A.C. power is supplied through a relatively long cable from an appropriate source to a load that is frequently mobile. The cable includes a plurality of power conductors, usually one for each phase, as well as a plurality of ground conductors, usually a number equal to the number of phases. The majority of cables have the power and ground conductors symmetrically arranged. All of the ground conductors are connected together at the two ends of the cable, with the common connection at the supply source being connected to a neutral terminal through a resistor for safety purposes.

The ground conductors of the cable are susceptible to breaking, causing open circuits which result in an unbalanced voltage being induced in equipment at the load end of the cable. The induced unbalanced voltage is a potential safety hazard to personnel working around the equipment. The extent of the safety hazard is realized by the enactment of a United States Federal Law requiring the ground condition to be monitored by passing a signal from an insulated ground conductor to a frame of equipment at the load end of the cable. The signal must be returned through the ground conductor to a safety ground at the source.

Devices to monitor the condition of the ground conductor have been introduced into the market place. Generally, these devices can be divided into four different categories as follows:

1. Sensing reflected impedance between the ground conductor and a pilot line;
2. Sensing the impedance between the ground conductor and a pilot line; and
3. Transmitting a D.C. or A.C. signal from the load end of the cable through the ground conductors to a full-wave bridge rectifier at the source end of the cable.
4. Applying a D.C. signal to a loop which includes the ground conductors and measuring the potential developed across a shunt placed in the ground conductors.

Each of these devices has its own advantages and disadvantages regarding sensitivity, cost, safety, probability of malfunctioning, effects of transients and cable length, as well as induced A.C. voltages in the cable which are potentially dangerous. Also, the use of a pilot wire in many of the systems potentially requires the replacement of the existing cables, which do not have such a wire therein.

BRIEF DESCRIPTION OF THE INVENTION

In accordance with the present invention, most of the problems with the prior art devices are overcome by utilizing the principles of symmetrical components to detect positive and negative sequence current components in the plural ground conductors. Typically, the polyphase cable is responsive to a three-phase source and the power conductors thereof normally carry a set of balanced positive-sequence current components. The power and ground conductors are coupled together so that under normal conditions positive-sequence current components are induced in the ground conductors by the currents flowing in the power conductors. In response to an imperfection in the line occurring due to one of the ground conductors breaking, i.e., opencircuiting, negativesequence current components are induced in the ground conductors.

In response to two or three of the three ground conductors of a three-phase cable being broken, no negative-sequence or positive-sequence current components are induced in the ground conductors because there is either no current flowing in the ground conductors or only one of the ground conductors has a current flowing therein, in which case there is no meaningful definition of positive or negative sequence current components. Thereby, in accordance with another aspect of the invention, a break in two or three ground conductors of a three-phase cable is detected by sensing that there is current flowing in one of the power conductors while there are simultaneously no positive-sequence current components in the ground conductors. For an N phase cable having N ground conductors, where N is more than three, a break in the ground conductors is detected by sensing no positive-sequence components in (N-1) or N phases in combination with current flow in a power conductor.

The impedances and currents of the ground conductors are relatively low. Thereby, the phase sequence current components are sensed with relatively high quality current transformers that are inductively coupled to the ground conductors and do not significantly disturb the currents induced in the ground conductors. It has been found, however, that such current transformers have a tendency to introduce harmonics of a fundamental frequency of the A.C. voltage applied to the cable. To suppress the harmonics, filters are provided so that the harmonics do not affect a relay that is tripped in response to sensing an open circuit of one or more of the ground conductors.

In accordance with another aspect of the invention, the phase sequence components of the first, second and third ground conductors are sensed by an electronic network including operational amplifier means responsive to voltages that are replicas of the currents sensed by the current transformers. The operational amplifier means includes input and feedback impedances, at least one of which includes a resistor and another of which includes a capacitor. The impedances are selected so that a predetermined phase shift is introduced by the network on each of the voltage replicas. To sense a positive-sequence, the voltages of the second and third conductors are respectively phase advanced by 120° and 240° relative to the voltage of the first conductor which can be considered as having a reference phase. To detect a negative phase sequence, the values of the impedances of the operational amplifier means are selected so that the voltages of the second and third phases are delayed by 120° and 240° relative to the reference phase voltage. The phase shifted voltages are additively combined in separate operational amplifier networks. The magnitude of the A.C. voltage derived from each of the operational amplifier networks is compared with a reference value to indicate the presence or absence of a positive or negative sequence.

Calculations reveal that monitoring the sequence components of currents induced in the ground conductors results in a detection process that is more sensitive than that employed in any of the prior art instruments. In addition, apparatus for monitoring the sequence components is relatively simple and can be utilized with the majority of existing cables connecting mobile equipment in a mine with an A.C. polyphase source.

It is, accordingly, an object of the present invention to provide a new and improved apparatus for sensing a broken conductor in a polyphase cable including a plurality of ground conductors.

Another object of the invention is to provide a new and improved apparatus for sensing a broken ground conductor in a polyphase cable having a plurality of ground conductors and for open-circuiting power conductors in the cable in response to a broken ground conductor occurring.

Another object of the invention is to provide a new and improved apparatus particularly adapted for sensing broken ground conductors in cables utilized for supplying polyphase currents from a power distribution center to mobile equipment in a mine.

Another object of the invention is to provide a new and improved electronic apparatus for enabling sequence components in a polyphase cable to be detected.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 1 is an overall system diagram of a preferred embodiment of the present invention;

FIG. 2 is a side-sectional view of the cable illustrated in FIG. 1; and

DETAILED DESCRIPTION OF THE DRAWING

Figure 3:
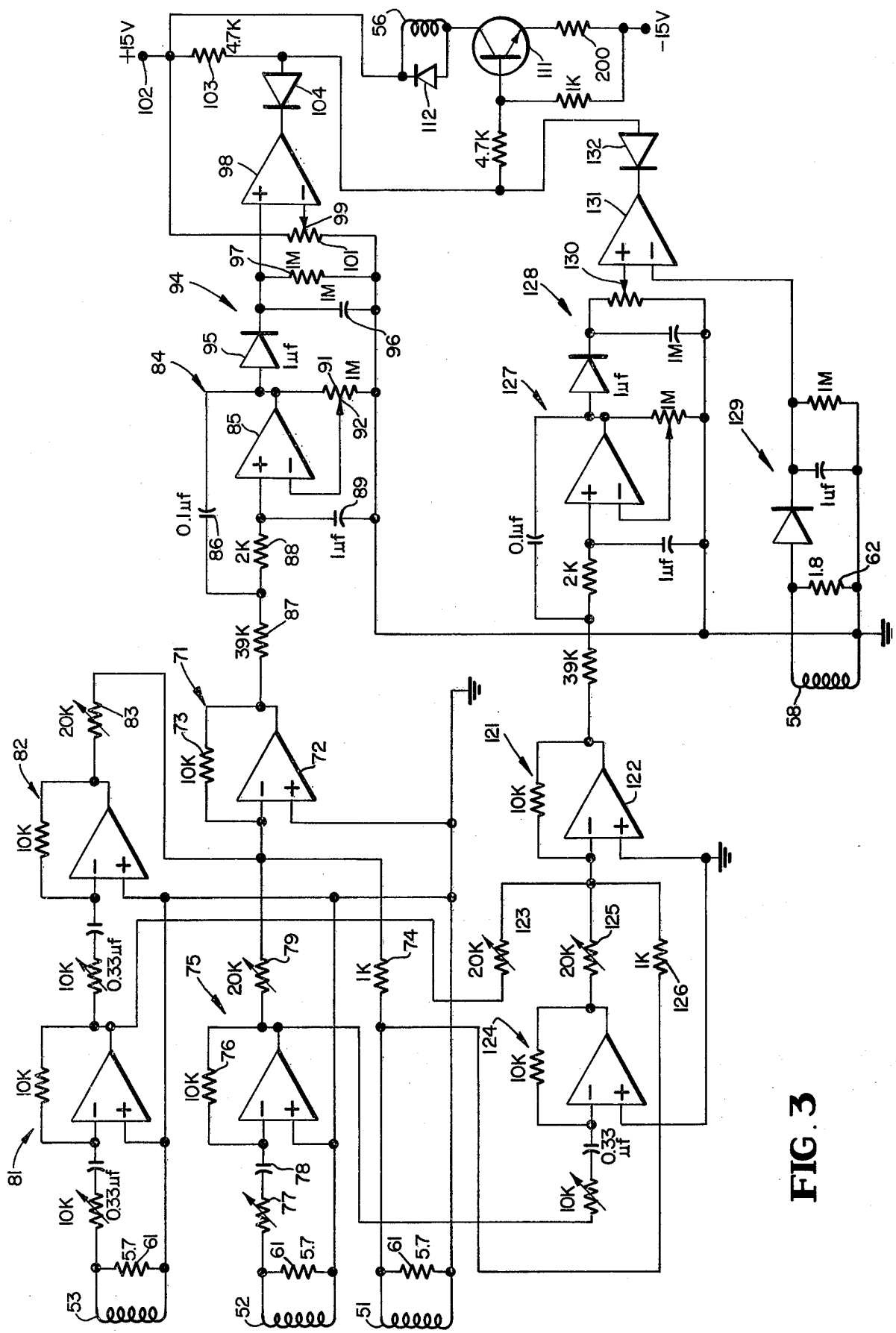
FIG. 3 is a circuit diagram of a controller used in the system of FIG. 1.

The detailed description of the drawing is concerned with a three-phase system for supplying current to a mobile load in a mine. It is to be understood, however, that the principles of the invention are applicable to any polyphase system i.e., to an N-phase system (where N exceeds two) having plural ground conductors in a cable.

Reference is now made specifically to FIG. 1 of the drawing wherein there is illustrated a system for supplying power through a three-phase cable 11 to a mobile three-phase A.C. load 12 in a coal mine from a three-phase A.C. power distribution center or source 13 inside the mine. Power distribution center 13 is responsive to three-phase, relatively high voltage, 60 Hertz voltage, from a surface substation (not shown). Power from the surface substation is supplied to delta connected primary windings 14 of three-phase transformer 15 by a three-phase cable 16. Secondary windings 17 of transformer 15 are typically connected in a wye configuration that includes a neutral terminal 18 and output terminals 19–21. Cable 16, in addition to and including three power conductors connected to apex terminals of primary windings 14, includes a safety ground wire 23 that is connected to terminal 24 of power distribution center 13.

Between neutral terminal 18 and terminal 24, there is connected a ground safety resistor 25, across which is connected a coil 26 of relay 27. In response to the voltage across safety ground resistor 25 exceeding a predetermined value, coil 26 of latching relay 27 is energized, closing contacts 28 to supply voltage coupled through a relay contact from terminal 21 to coil 29 of circuit breaker 30. Circuit breaker 30 includes three normally closed contacts 31, 32 and 33 which are respectively connected in series between terminals 19, 20 and 21 and power conductors 35, 36 and 37 of cable 11. Thereby, in response to the voltage between neutral terminal 18 and ground terminal 24 exceeding a predetermined magnitude, energization voltage to coil 29 is derived from power conductors 36 and 37, causing contacts 31–33 to open circuit to remove power from conductors 35–37.

Cable 11, in addition to including three-phase power conductors 35–37, includes three ground conductors 41, 42 and 43 that terminate at common ground terminal 24 of power distribution center 13 and at a common terminal 44 on a frame ground of the mobile load 12. Ground conductors 41–43 are inductively coupled to each other and to power conductors 35–37 so that different currents flow in the ground conductors. One type of cable that is frequently employed in the mining industry for connecting power distribution center 13 to a mobile load 12 is known as a type G cable, as illustrated in cross-section in FIG. 2. In the type G cable, the three power conductors 35, 36 and 37 are symmetrically nested relative to each other and are mutually insulated by separate dielectric layers 38, one of which covers each of the power conductors. Symmetrically nested between power conductors 35–37 are ground conductors 41–43, having a lower cross-sectional area than the power conductors. Thereby, a number of ground conductors are provided equal to the number of phases of the three-phase current applied by power conductors 35–37 between power distribution center 13 and load 12. Power conductors 35–37 are arranged so that the centers thereof define apices of a first equilateral triangle having a base that extends horizontally between the centers of conductors 35 and 37 and a height extending vertically between the center of conductor 36 and a bisector between the centers of power conductors 35 and 37. Ground conductors 41–43 are arranged so that the centers thereof form apices of a second equilateral triangle that is larger than and inverted relative to the first equilateral triangle. The altitude of the second equilateral triangle lies along the same line as the altitude of the first equilateral triangle. Both equilateral triangles have a common center, coincident with the center of a circle that defines the inside diameter of rubber tubing 44. Tubing 44 forms the outer covering of cable 11 and engages a peripheral portion of each of ground conductors 41–43 and a peripheral portion of the dielectric layer 38 on each of power conductors 35–37.

Each of power conductors 35–37 and ground conductors 41–43 includes a finite impedance per unit length which is composed of the resistance of the conductor, the self-inductance of the conductor, and the mutual reactance of the conductor relative to the other conductors in the cable. The mutual reactance can generally be considered as consisting of mutual inductance between the several conductors, since the impedance of the capacitance between the conductors can be considered as virtually negligible at the 60 Hertz excitation frequency. (For convenience, the following subscript nomenclature is employed: the power conductors 35–37 are respectively represented by the subscripts 1, 2 and 3; the ground conductors 41, 42 and 43 are respectively represented by the subscripts 4, 5 and 6.) For 60 Hertz excitation, the mutual impedance between any two conductors ($i$ and $k$) in cable 11 is given as:

$$Z_{ik} = j \frac{4.657 \times 60 \times 10^{-3}}{5280} L \log \frac{12}{D_{ik}} \text{ohms} \qquad (1)$$

where:
  $i$ is not equal to $k$,
  $D_{ik}$ is the distance from the center of conductor $k$ to the center of conductor $i$, in inches,
  $L$ = the length of cable 11 in feet,
  $j = \sqrt{-1}$.

The self impedance of conductor $i$, including its resistance and self inductance, can be represented, for 60 Hertz excitation, as:

$$z_{ii} = r_i L + j \frac{4.567 \times 60 \times 10^{-3}}{5280} L \log \frac{12}{D_{si}} \text{ohms} \qquad (2)$$

where:
  $r_i$ is the resistance of the conductor $i$ in ohms per foot, and
  $D_{si}$ = the self-geometric mean distance of conductor $i$ in inches.

If cable 11 is supplied with an A.C. voltage other than 60 Hertz, the number (60) in Equations (1) and (2) is modified accordingly.

Before considering the invention further, consideration is given to certain principles of symmetrical components. Utilizing standard symmetrical component nomenclature, positive-sequence current components of a balanced three-phase line include three equal magnitude vectors ($I_g^{(1)}$, $a^2I_g^{(1)}$, $aI_g^{(1)}$) displaced from each other by 120° and having the sequence of vectors applied by secondary winding 17 to the line 11; where:
  $I_g$ = the ground current, and $$a \text{ (a vector operator)} = \epsilon^{j120°} = \left(-\frac{1}{2} + j\frac{\sqrt{3}}{2}\right) \text{ and}$$

$$a^2 = \epsilon^{j240°} = \left(-\frac{1}{2} - j\frac{\sqrt{3}}{2}\right) \text{ and}$$

$$a^3 = 1.$$

Negative-sequence current components include three vectors ($I_g^{(2)}$, $aI_g^{(2)}$, $a^2I_g^{(2)}$) equal in magnitude and displaced from each other by 120° and having a sequence opposite to that of the vectors applied by secondary winding 17 to cable 11. Zero-sequence current components include three equal vectors ($I_g^{(0)}$, $I_g^{(0)}$, $I_g^{(0)}$) pointing in the same direction. The currents in ground conductors 41, 42 and 43 can be mathematically expressed as the positive-sequence, negative-sequence and zero-sequence current components, in accordance with:

$$I_4 = I_g^{(0)} + I_g^{(1)} + I_g^{(2)} \qquad (3)$$
$$I_5 = I_g^{(0)} + a^2 I_g^{(1)} + a I_g^{(2)} \qquad (4)$$
$$I_6 = I_g^{(0)} + a I_g^{(1)} + a^2 I_g^{(2)} \qquad (5)$$

Because of the symmetrical arrangement of the power and ground conductors, the mutual impedances between adjacent power conductors and the ground conductors are equal, i.e., $$Z_{41} = Z_{52} = Z_{63} = Z_{42} = Z_{53} = Z_{61} = Z_{m1};$$

the mutual impedances between the remaining, i.e. remote, power and ground conductors are equal, i.e., $$Z_{43} = Z_{51} = Z_{62} = Z_{m2}; \text{ and}$$

the mutual impedances between the different ground conductors are equal, i.e., $$Z_{46} = Z_{54} = Z_{65} = Z_{mg}.$$

Also, the symmetrical and identical geometric nature of the ground conductors means that the self-impedance of each conductor is the same, i.e.

$$Z_{44} = Z_{55} = Z_{66} = Z_{sg},$$

and the self-impedance of all of the power conductors is equal, i.e.

$$Z_{11} = Z_{22} = Z_{33} = Z_{sp}.$$

Based upon these relationships, it can be shown for a balanced system when no broken ground conductor occurs that: (1) there is no negative-sequence current component in the ground conductors 41–43, (2) there is zero voltage drop in the ground conductors, and (3) the positive-sequence current components in the ground conductors are proportional to positive-sequence current components in power conductors 35–37.

In contrast, from Equations 3–5, it can be shown that the negative-sequence ground current component for a broken ground conductor 41, i.e., when ground conductor 41 is open-circuited, can be represented as:

$$I_{gb}^{(2)} = \frac{-a(Z_{m1} - Z_{m2}) I_p^{(1)}}{2(Z_{sg} - Z_{mg})}$$

where:
  $I_p^{(1)}$ = the positive-sequence current component of power conductors 35–37 of cable 11.

If the resistive impedance (R) of a ground conductor, e.g. conductor 41, increases beyond a normal value, without reaching an open circuit, it can be shown that the negative ground sequence current component can be represented as:

$$I_g^{(2)} = \frac{-a(Z_{m1} - Z_{m2}) R I_p^{(1)}}{(Z_{sg} - Z_{mg})(3Z_{sg} - 3Z_{mg} + 2R)} \qquad (7);$$

$$K = \frac{Z_{sg} - Z_{mg}}{R},$$

by letting
Equation (7) can be rewritten as:

$$I_g^{(2)} = \frac{2 I_{gb}^{(2)}}{3K + 2} \qquad (8).$$

From Equation (8), it is seen that as K increases, as occurs in response to an increase in $Z_{sg} - Z_{mg}$ or a decrease in R, the negative-sequence current decreases. An investigation of the effect of the resistive impedance of conductor 41 on the magnitude the negative-sequence current, $I_g^{(2)}$ reveals the worst case is for a cable 11 having a maximum value of ($Z_{sg} - Z_{mg}$), as is attained by reducing the size of the conductors in cable 11 as far as possible. Therefore, the smallest gauge possible cable (AWG 6) is chosen for investigation. With typical dimensions, the value of $Z_{sg} - Z_{mg}$ is calculated for an AWG 6 type G cable as (1.12+j0.05) ohms per 1,000 feet. Table 3.1, at the end of the specification, indicates the ratio of negative-sequence current of cable 11 for a no fault condition relative to the negative-sequence current with ground conductor 41 in an open-circuited condition for various resistance values.

From the last column in the table, it is apparent that the ratio of the negative-sequence ground current for normal conditions and for an open-circuited ground conductor 41 provides a very sensitive arrangement for detecting the presence of an open-circuited condition in ground conductor 41. Because of symmetry, it is apparent that a comparison of the negative-sequence current of the ground conductors for a normal condition can be utilized to detect a broken ground conductor in any one of the ground conductors.

To enable the negative-sequence current components of ground conductors 41–43 to be detected, current transformers 51, 52 and 53 are provided at power distribution center 13 to respectively sense the currents of ground conductors 41, 42 and 43 and derive current waveforms that are replicas of the currents in the three ground conductors. The current replicas induced in current transformers 51–53 have the same phase as the currents in ground conductors 41–43 and produce voltage proportional at any instant to the currents in the ground conductors. Current transformers 51–53 are preferably of a high quality type that do not appreciably load or effect the impedances of ground conductors 41–43. Transformers 51–53 do not draw significant current from ground conductors 41–43, a particularly advantageous feature because the currents are relatively low under normal conditions.

The currents induced in current transformers 51–53 are supplied to controller 54 which includes a relay 55 having excitation winding 56 and contacts 57 which are open during normal operation and connected in parallel with contacts 28. In response to negative-sequence current components being induced in windings 51–53, controller 54 includes circuitry to activate coil 56 so that contacts 57 close, thereby to trip coil 29 of circuit breaker 30 and open circuit contacts 31–33 in the line connecting secondary winding 17 of power transformer 15 to power conductors 35–37.

If a break should occur in two or three of the ground conductors 41–43, there can be no negative-sequence or positive-sequence current components derived from current transformers 51–53. This is evident because, if all three of ground conductors 41–43 are broken, there is no current induced in any of the current transformers; in the event of two of the ground conductors 41–43 being broken, a current is induced in only one of the current transformers 51–53. A break in all three or two of the three ground conductors 41–43, without the entire cable 11 being severed, results in an alternative unsafe condition if the power conductors are not likewise broken. By detecting (1) the presence of current flowing in one of the power conductors, e.g., power conductor 37, with current transformer 58 on the power conductor, and (2) the failure of a positive-sequence current component in the ground conductors, the alternative unsafe condition can be determined. In response to controller 54 detecting the alternative unsafe condition, coil 56 of relay 55 is energized, thereby open-circuiting contacts 57 and causing circuit breaker 30 to be tripped open.

A circuit diagram of a preferred circuit for controller 54 is illustrated in FIG. 3.

A basic element included in controller 54 is a high gain operational amplifier network having phase inverting properties, a feedback impedance, and an input impedance. Certain of the amplifier networks are utilized as summing amplifiers, while others are employed as phase shift amplifiers to provide a total phase shift of +240°, as represented by the vector operator $a^2$. To provide the +240° phase shift, the operational amplifier feedback impedance is a resistance having a value of 10K. The input impedance of the amplifier includes a series resistance and capacitance; preferably, the capacitance has a value of 0.33 microfarads, and the resistance is provided by a variable resistor that is appropriately adjusted to provide the 240° phase shift. By cascading two of the phase shifting operational amplifier circuits together, the vector operation $a$ is provided since cascading results in the operation $a^2 \cdot a^2 = a^4 = a$. Thereby, a single phase shifting operational amplifier provides a +240° phase shift, while a pair of cascaded phase shifting amplifiers provides an effective phase shift of +120°.

The current replicas induced in transformers 51–53 and 58 are converted into voltages that are amplitude and phase replicas of the current replicas by connecting each of the current transformers across a separate load resistor 61. Each of load resistors 61 has the same value to achieve this result, while load resistor 62, shunted across current transformer 58, has a lower value because of the higher current induced in current transformer 58 by power conductor 37. The voltages developed across load resistors 61 are applied to high input impedance operational amplifiers so that the remainder of the circuitry included in controller 54 does not load the current transformers and thereby does not affect the currents in ground conductors 41–43.

To detect the presence of negative-sequence current components in ground conductors 41–43, the currents of ground conductors 41–43 are combined to indicate the negative-sequence ground current components, $I_g^{(2)}$, in accordance with:

$$I_g^{(2)} = \frac{1}{3}(I_4 + a^2 I_5 + a I_6) \tag{9}$$

To this end, the voltage replica of the current of ground conductor 41, as developed across current transformer 51, is supplied as one input to a 180° phase shifting operational amplifying circuit 71, including operational amplifier 72, feedback resistor 73, and input resistor 74. The term $a^2 I_5$ from Equation (9) is provided by supplying the voltage developed across current transformer 52 to a 240° phase shifting operational amplifier circuit 75 including feedback resistor 76 and an input impedance including series resistor 77 and capacitor 78. The output of operational amplifier circuit 75 is applied to the input terminal of operational amplifier 72 via variable resistor 79. The term $a I_6$ is developed by supplying the voltage across transformer 53 to the input impedance of 240° phase shifting operational amplifier circuit 81. Connected in series with 240° phase shifting operational amplifier circuit 81 is a second 240° operational amplifier circuit 82, which develops an A.C. output voltage that is coupled to the input terminal of operational amplifier 72 by variable resistor 83. The values of resistors 79 and 83 are adjusted so that for equal currents supplied to transformers 52 and 53, equal voltage contributions are derived from the output of summing, 180° phase shifting operational amplifier circuit 71.

In operation, under normal conditions, the phases of the voltages developed across the current transformers 51, 52 and 53 can usually be represented as equal amplitude voltages displaced in phase by 120° relative to each other. The voltage developed across transformer 51 can be considered as having a zero or reference phase, while the voltages respectively developed across transformers 52 and 53 can be considered as having phases of +120° and −120° relative to the reference phase. The voltages developed across transformers 51–53 are effectively from three different channels. The voltage applied to the channel including transformer 51 is supplied to circuit 71 with a reference phase, the voltage from the channel including transformer 52 is supplied to the input of circuit 71 with a phase shift of −120° relative to the reference phase, and the voltage from the channel including current transformer 53 is supplied to circuit 71 with a phase shift of −240° relative to the reference phase. For the above indicated normal situation, it is evident that the voltages supplied to operational amplifier circuit 71 sum to a null voltage. In contrast, if the negative-sequence current components are exactly balanced, the three voltages applied to amplifier circuit 71 are exactly in phase and thereby sum to a vector having a magnitude three times the magnitude of the vector of the reference channel including transformer 51. Hence, by detecting the amplitude of the voltage derived from operational amplifier circuit 71, an indication of the presence of negative-sequence current components in ground conductors 41–43 can be derived.

To enable the voltage magnitude derived from amplifier circuit 71 to represent the negative-sequence current components indicated by Equation (9), it is necessary to remove any harmonic components of the 60 Hertz A.C. source that may have been introduced either in the line or in the controller network. In particular, current transformers 51–53 are susceptible to introducing odd harmonics, and in particular the third harmonic. To these ends, the output of operational amplifier circuit 71 is applied to an active low pass harmonic filter 84 that includes operational amplifier 85 having a feedback capacitor 86 which is connected to a tap between series connected input resistors 87 and 88. One terminal of series resistor 88 is connected to a non-inverting input terminal of amplifier 85 thereby to provide a positive feedback circuit. The non-inverting feedback path is provided between the output terminal of amplifier 85 and an inverting input terminal of the amplifier by connecting the output terminal of the amplifier to ground through potentiometer 91, having a tap 92 which is connected to the inverting input terminal.

The level of the A.C. voltage developed by harmonic filter 84 is detected and converted into a D.C. voltage by a rectifier circuit 94 including a series connected diode 95 and a smoothing circuit including a shunt circuit comprising parallel capacitor 96 and resistor 97. The D.C. voltage developed across resistor 97 is proportional to the negative-sequence current and compared with a reference D.C. voltage in operational amplifier 98, having a non-inverting input terminal connected to be responsive to the output of rectifier 94 and an inverting input terminal connected to tap 99 of potentiometer 101 that is connected between ground and a positive D.C. power supply voltage at terminal 102. In response to the predetermined D.C. voltage at tap 99 exceeding the voltage derived from rectifier 94, the output voltage of amplifier 98 is at the level of terminal 102 so that no current flows from terminal 102 through resistor 103 and diode 104. In response to a negative-sequence current being sensed, the output of amplifier 98 is at a voltage appreciably lower than that of terminal 102, causing current to flow through resistor 103 and diode 104.

To control energization of relay coil 56, the coil is connected to the collector of NPN transistor 111, having a base connected to be responsive to the voltage developed across resistor 103. Under normal conditions, no current flows through resistor 103 so that transistor 111 is forward biased and current flows through coil 56, that is shunted by diode 112 to protect transistor 111. In response to coil 56 being in its normal energized state, contacts 57 are open, enabling contacts 31–33 to be closed. In response to current flowing through resistor 103, transistor 111 is back biased and current no longer flows through relay 56, thereby closing contacts 57 and opening contacts 31–33.

To enable controller 54 to activate coil 56 in the event of two or three of ground conductors 41–43 open-circuiting while current flows in the power conductors 35–37, a positive-sequence current component detection circuit is provided. The positive-sequence current component detection circuit includes summing operational amplifier 121 that responds to the currents from ground conductors 41–43 to derive a measure of the positive sequence ground current components, $I_g^{(1)}$, in accordance with:

$$I_g^{(1)} = \tfrac{1}{3}(I_4 + aI_5 + a^2I_6) \qquad (10)$$

To these ends, the output voltage of 240° phase shifting operational amplifier 81 is applied to an inverting input terminal of summing amplifier 122 included in operational amplifier circuit 121; the connection between amplifier 81 and the input terminal of amplifier 122 is via input variable resistor 123 to thereby provide the term $a^2I_6$ in Equation (10). The term $aI_5$ is formed by supplying the output of 240° phase shifting amplifier circuit 75 to an input impedance of 240° phase shifting amplifier circuit 124, which develops an output voltage that is coupled via variable resistor 125 to the input terminal of amplifier 122. The term $I_4$ in Equation (10) is derived by supplying the voltage developed across current transformer 51 to the input terminal of amplifier 122 via fixed resistor 126. The values of variable resistors 123 and 125 are adjusted so that the voltage developed across the output terminal of amplifier circuit 121 represents the positive-sequence component of the currents in current transformers 51–53.

The output voltage of amplifier circuit 121 can be considered as representing the vector sum of the currents applied to (1) a reference channel, including current transformer 51, (2) a first channel in which the voltage developed across current transformer 52 is effectively phase shifted by +120° relative to the reference channel, and (3) a second channel in which the voltage developed across current transformer 53 is effectively phase shifted +240° relative to the reference channel. In response to positive-sequence current components existing in the ground conductors 41–43, the output voltage of amplifier circuit 121 is a positive voltage having a magnitude three times that of the voltage representing one vector. In contrast, for balanced negative-sequence current components in conductors 41–43, the output voltage of amplifier circuit 121 is virtually a null.

The third harmonics of A.C. voltage derived from amplifier circuit 121 are removed by active filter circuit 127 that is the same as active filter circuit 84. The output circuit of low pass, harmonic filter 127 is applied to a rectifier 128 that is the same as rectifier 94. The positive-sequence ground current and the current of power conductor 37 are compared by supplying a percentage of the voltage, determined by the setting of tap 130, developed across rectifier 128 and a D.C. voltage indicative of the voltage across current transformer 58, as derived from rectifier 129, to non-inverting and inverting input terminals of operational amplifier 131. When the voltage derived from rectifier 128 exceeds the voltage derived from rectifier 129, an indication is provided that the positive-sequence current components of ground conductors 41–43 are less in magnitude than the current induced in current transformer 58 by power conductor 37. Thereby, an indication is provided that the positive-sequence current component of conductors 41–43 is effectively zero while a finite non-zero current is flowing in power conductor 37.

In response to the voltage derived from rectifier 129 exceeding the voltage derived from tap 130 of rectifier 128, the output voltage of amplifier 131 is at the level of terminal 102, resulting in energization of relay coil 56, opening of contacts 57 and enabling contacts 31–33 to be open-circuited. In response to two or three of ground conductors 41–43 opening, the output voltage of amplifier 131 drops, causing current to flow through resistor 103 to diode 132, whereby transistor 111 is back biased. In response to back biasing of transistor 111, coil 56 is deenergized and contacts 31–33 open. It is thereby seen that, if a broken ground conductor is sensed because of a significant increase in the resistance of any of ground conductors 41–43, contacts 31–33 are open-circuited, removing the safety hazard.

While there has been described and illustrated one specific embodiment of the invention, it will be clear that variations in the details of the embodiment specifically illustrated and described may be made without departing from the true spirit and scope of the invention as defined in the appended claims. For example, the active negative-sequence and positive-sequence component detector included in controller 54 can be replaced by a passive circuit. Also, the principles of the invention can be extended to a conductor including N phases wherein N power conductors and N ground conductors are included. In such an instance, N current transformers are provided for the ground conductors, and controller 54 includes N channels. The phase shift of any channel is 360° × K where:

$$K = \frac{1}{N}, \frac{2}{N} \ldots \frac{N-1}{N}, \text{ and}$$

N = the number of phases.

For a positive-sequence current component detection circuit, the phase shift of each channel is advanced by 360° × K relative to the reference channel. Also, the principles of the invention are applicable to asymmetrical situations, e.g., in monitoring a type G-GC cable in which the ground and power conductors are not symmetrical. In such a case, positive and negative-sequence current components are determined for a normal cable configuration. These components can be combined with the detected positive and negative-sequence current components to control contacts 31–33.

TABLE

| RESISTANCE (ohms) | Sensitivity of Negative-Sequence Scheme $\frac{I_n^{(2)}}{I_{ab}^{(2)}}$ |
| --- | --- |
| 0.1 | 0.0555 |
| 0.3 | 0.151 |
| 0.7 | 0.295 |
| 1.0 | 0.373 |
| 3.0 | 0.642 |
| 7.0 | 0.808 |
| 10.0 | 0.855 |

What is claimed is:

1. Apparatus for detecting a broken ground conductor in a polyphase A.C. cable having a separate power conductor for each phase and an equal number of ground conductors, said power conductors normally carrying a set of balanced positive-sequence currents, said conductors being reactively coupled together so that currents are induced in the ground conductors in response to currents flowing in the power conductors, positive-sequence currents normally being induced into the ground conductors by the power conductors, comprising means coupled to the ground conductors for sensing a negative-sequence current induced in the ground conductors and for deriving a first signal indicative of a negative-sequence current being sensed, means coupled to the conductors for deriving a second signal indicative of no current flowing in the ground conductors because a plurality of the ground conductors are open-circuited, and means responsive to either the first or second signal being derived for open circuiting the polyphase power conductors.

2. The apparatus of claim 1 wherein the means coupled to the ground conductors includes a separate current transformer inductively coupled to each ground conductor, each of said current transformers being connected to drive a relatively high input impedance terminal of an amplifier, whereby the means coupled to the ground conductors does not significantly load the ground conductors and does not significantly disturb the currents induced in the ground conductors.

3. The apparatus of claim 2 wherein the current transformers have a tendency to introduce harmonics of a fundamental frequency of the alternating current supplied to the cable, and filter means for suppressing said harmonics so that the harmonics do not affect the means for open-circuiting the power conductors.

4. The apparatus of claim 1 wherein the second signal deriving means includes means for sensing a positive-sequence current induced in the ground conductors and for deriving a third signal in response to no positive-sequence currents being induced, means for sensing the presence of a current flow in one of the power conductors and for deriving a fourth signal in response to current flow in the power conductor being sensed, and means for deriving the second signal in response to the third and fourth signals being simultaneously derived.

5. Apparatus for detecting a broken ground conductor in a polyphase A.C. cable having a separate power conductor for each phase and an equal number of ground conductors, said conductors being reactively coupled together so that currents are induced in the ground conductors in response to currents flowing in the power conductors, comprising means coupled to the ground conductors for sensing the sequence components of currents induced in the ground conductors, and means responsive to the sensed sequence components for controlling connections of the power conductors between a power source and a load.

6. The apparatus of claim 5 wherein the means for controlling connections includes means for open-circuiting the power conductors in response to a predetermined sequence being sensed.

7. The apparatus of claim 6 wherein the means for open-circuiting is responsive to a negative sequence being sensed.

8. The apparatus of claim 6 further including means for sensing current flowing in one of the power conductors, and wherein the means for open-circuiting is responsive to the current sensing means sensing the flow of current and the absence of a positive sequence being sensed.

9. The apparatus of claim 5 wherein the means for sensing includes a network comprising a channel for each conductor and responsive to the current induced in the ground conductor for the channel, each of said channels including means for deriving an A.C. voltage that is a replica of the induced current for the channel, said network including operational amplifier means responsive to the voltages and having input and feedback impedances, at least one of the impedances including a resistance and another of the impedances including a capacitor, the values of components included in the impedances being such that the A.C. voltage applied to each of the channels, except a reference channel, is transformed into a phase shifted voltage relative to an output voltage of the reference channel, the phase shift being on the order of $360° \times K$ where $$K = \frac{1}{N}, \frac{2}{N} \cdots \frac{N-1}{N},$$

and N = the number of phases.

10. The apparatus of claim 9 wherein the operational amplifier means and the values of the impedances effectively cause the phase of the voltage applied to each channel to be advanced relative to the output voltage of the reference channel, whereby the network derives an output signal having a magnitude indicative of a positive sequence.

11. The apparatus of claim 9 wherein the operational amplifier means and the values of the impedances effectively cause the phase of the voltage applied to each channel to be delayed relative to the output voltage of the reference channel, whereby the network derives an output signal having a magnitude indicative of a negative sequence.

12. Apparatus for enabling phase sequence components of polyphase currents to be derived comprising a network including a channel for each phase, each channel including means for monitoring each of the currents and for deriving a separate voltage that is a replica of each of the monitored currents, said network including means for deriving an output signal representing the vector sum of phase shifted voltages of the different channels, the voltage for channel K being phase shifted by $360° \times K$, where $$K = 0, \frac{1}{N}, \frac{2}{N} \cdots \frac{N-1}{N}$$

and N = the number of phases, said network including operational amplifier means responsive to the voltages and having input and feedback impedances, at least one of the impedances including a resistance and another of the impedances including a capacitor, the values of components included in the impedances being such that the phase shifted voltages are derived.

13. The apparatus of claim 12 wherein the operational amplifier means and the values of the impedances effectively cause the phase of the voltage applied to each channel to be advanced relative to the output voltage of the reference channel, whereby the network derives an output signal having a magnitude indicative of a positive sequence.

14. The apparatus of claim 12 wherein the operational amplifier means and the values of the impedances effectively cause the phase of the voltage applied to each channel to be delayed relative to the output voltage of the reference channel, whereby the network derives an output signal having a magnitude indicative of a negative sequence.

* * * * *